United States Patent [19]

Takeuchi

[11] Patent Number: 5,673,867
[45] Date of Patent: Oct. 7, 1997

[54] SPINNING REEL FOR FISHING HAVING A FISHLINE ENTANGLEMENT PREVENTIVE MEMBER

[75] Inventor: Shinji Takeuchi, Tokyo, Japan

[73] Assignee: Daiwa Seiko, Inc., Tokyo, Japan

[21] Appl. No.: 580,388

[22] Filed: Dec. 28, 1995

[30] Foreign Application Priority Data

Dec. 28, 1994 [JP] Japan .................................. 6-339835

[51] Int. Cl.$^6$ .................................................. A01K 89/01
[52] U.S. Cl. ........................................................ 242/231
[58] Field of Search .................................. 242/231, 232, 242/233

[56] References Cited

U.S. PATENT DOCUMENTS

| 5,149,006 | 9/1992 | Hitomi ................................ 242/231 |
| 5,312,067 | 5/1994 | Sugawara et al. ................... 242/232 |
| 5,513,813 | 5/1996 | Bernard et al. ..................... 242/231 |

FOREIGN PATENT DOCUMENTS

| 3-74260 | 7/1991 | Japan . |
| 3-117463 | 12/1991 | Japan . |

*Primary Examiner*—Katherine Matecki
*Attorney, Agent, or Firm*—Sughrue, Mion, Zinn, Macpeak & Seas

[57] ABSTRACT

In a spinning reel for fishing, a bail is fitted via bail support members (5A, 5B) to the bail support arms (4A, 4B) of a rotor rotatably supported by a reel body. The bail support members are reversible between a fishline playing-out position and a fishline winding position. One bail support member is provided with a line roller. As the rotor rotates, the fishline is wound on the spool via the line roller. A fishline entanglement preventive member (8) is installed from the front part of the support member having the line roller fitted to one end of the bail toward the support member on the other end side of the bail, in order to ensure that a fishline is prevented from becoming entangled in the outer end portion in the axial direction of the line roller of the bail support member due to slackening and twisting of the fishline. With the benefit of the described structure, fishing can be enjoyed without encumbrance arising from fishline entanglement, in particular during the fishline winding operation.

27 Claims, 3 Drawing Sheets

SPINNING REEL FOR FISHING HAVING A FISHLINE ENTANGLEMENT PREVENTIVE MEMBER

BACKGROUND OF THE INVENTION

The present invention relates to a spinning reel for fishing and more particularly to a mechanism for preventing a fishline from becoming entangled as a result of slackening, twisting curling of the fishline, in a fishline guide portion having a line roller.

A mechanism for preventing a fishline from becoming entangled in a fishline guide portion having a line roller in a typical conventional spinning reel is known in the art. For example, Japanese Unexamined Utility Model Publication No. 74260/1991, discloses a fishline entanglement preventive mechanism including a fishline entanglement preventive member for preventing a fishline from becoming entangled in a fishline guide portion having a line roller. This fishline entanglement preventive mechanism is provided between the front side of the bail support portion of a bail support member and a bail. Further, Japanese Unexamined Utility Model Publication No. 117463/1991 also discloses an arrangement wherein a bail end portion is formed with an expanded surface which expands gradually toward a line-roller side and wherein the bail end portion is fitted to the open end portion of a bail support member without abrupt, stepwise changes in the profile.

Those mechanisms as disclosed in the aforementioned publications are designed to prevent fishline entanglement such that a fishline likely to become entangled is caused to slide onto the fishline entanglement preventive member or the expanded surface when the fishline tends to entangle itself in the bail fitting portion and the front side of the bail support member (the side in the direction of the leading end of the spool).

However, fishline entanglement in a fishline guide portion is normally caused by various factors. These include for example, twisting and curling of a fishline during the time the fishline is repeatedly wound and played out, the influence of blowing wind, and variations in tension during the winding operation; in other words, fishline entanglement is not actually caused by the same problem all the time.

In the case of such a conventional fishline entanglement preventive mechanism in a spinning reel, however, all factors causing fishline entanglement have not been taken into consideration. As it is impossible to deal with the entanglement of a slackened or looped fishline when the fishline becomes entangled on an end portion of a bail support member that is directed away from the bail side of the line roller in the axial direction, the fishline cannot be wound on a spool or may be cut out.

SUMMARY OF THE INVENTION

An object of the present invention, proposed in view of the foregoing problems, is to provide a spinning reel for fishing which ensures that a fishline is prevented from becoming entangled in an outer end portion, in the axial direction of the line roller, of a bail support member due to slackening and twisting of the fishline, so that fishing can be enjoyed without a hitch during the fishing operation (e.g., the fishline winding operation or in standby condition).

In order to accomplish the object above, a spinning reel for fishing according to the present invention, wherein a bail support member having a line roller fitted to one end of a bail is supported with the bail support arm of a rotor rotatably supported in a reel body, the bail support member being reversible between a fishline playing-out position and a fishline winding position, and wherein a fishline is wound on a spool via the line roller as the rotor rotates, is characterized in that a fishline entanglement preventive member is installed from the front part of the support member having the line roller fitted to one end of the bail toward the other end of the bail.

The spinning reel for fishing according to the present invention preferably includes a fishline entanglement preventive cover surrounding part of the inside roller face of the line roller provided for the bail support member for rigidly holding the one end side of the bail.

In the spinning reel for fishing according to the present invention, the fishline entanglement preventive member is preferably installed so that it is positioned from the front part of the support member having the line roller fitted to one end of the bail toward an opposite bail side and passes through an area radially inwardly from a flange of the spool with respect to the center of the spool shaft.

With the arrangement above according to the present invention, the fishline entanglement preventive member is installed from the front part of the support member having the line roller fitted to one end of the bail toward the other end of the bail, and the fishline is guided by the fishline entanglement preventive member to the line roller when the fishline is wound on the spool even though the fishline is slackened, looped and so forth, whereby the fishline is prevented from becoming entangled in the fishline guide portion.

DETAILED DESCRIPTION OF THE PREFERRED EMBODIMENTS

Embodiments of the present invention will subsequently be described by reference to the accompanying drawings.

Figure 1:
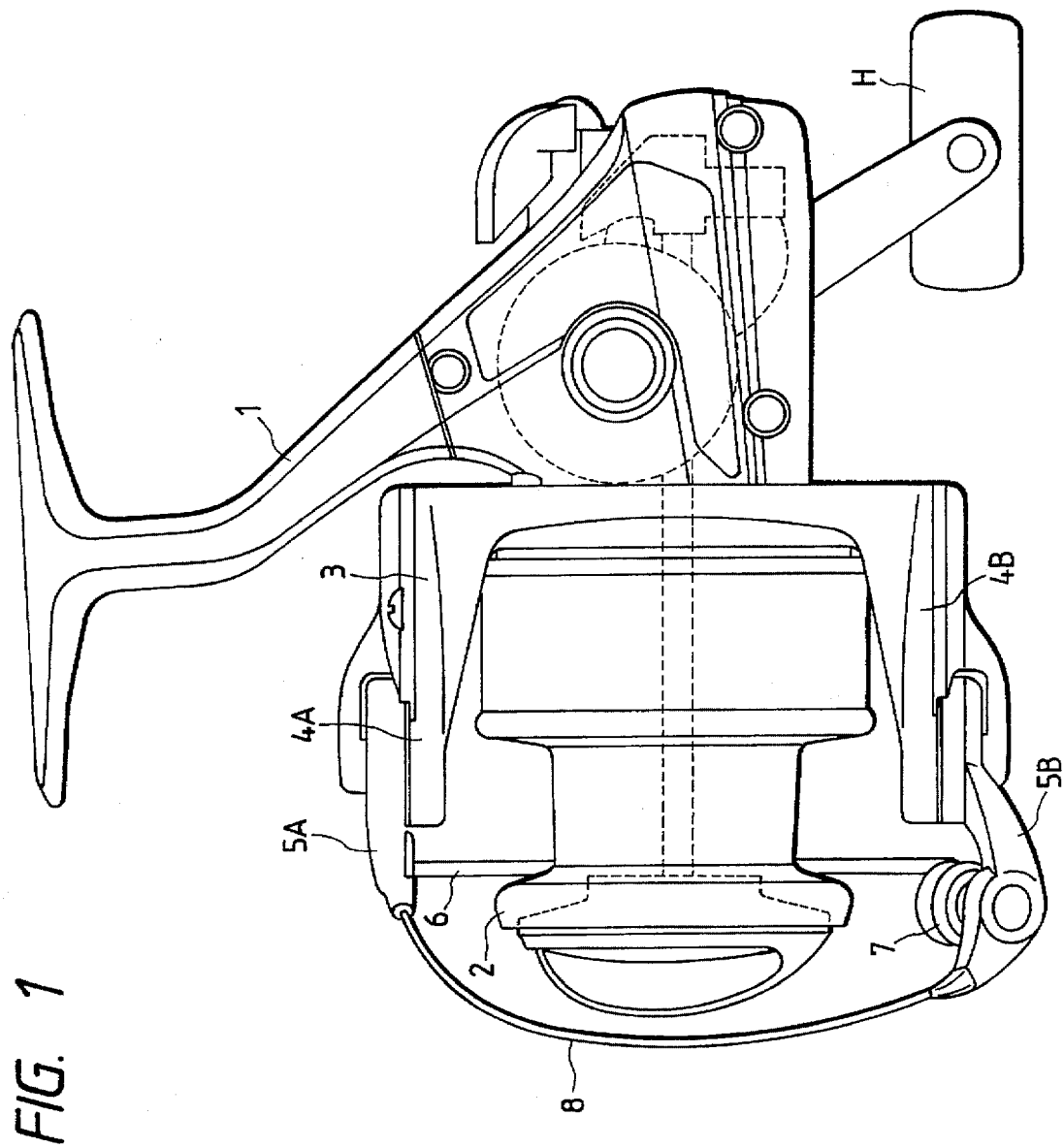
FIG. 1 is a side view showing a first embodiment of the present invention.
Figure 2:
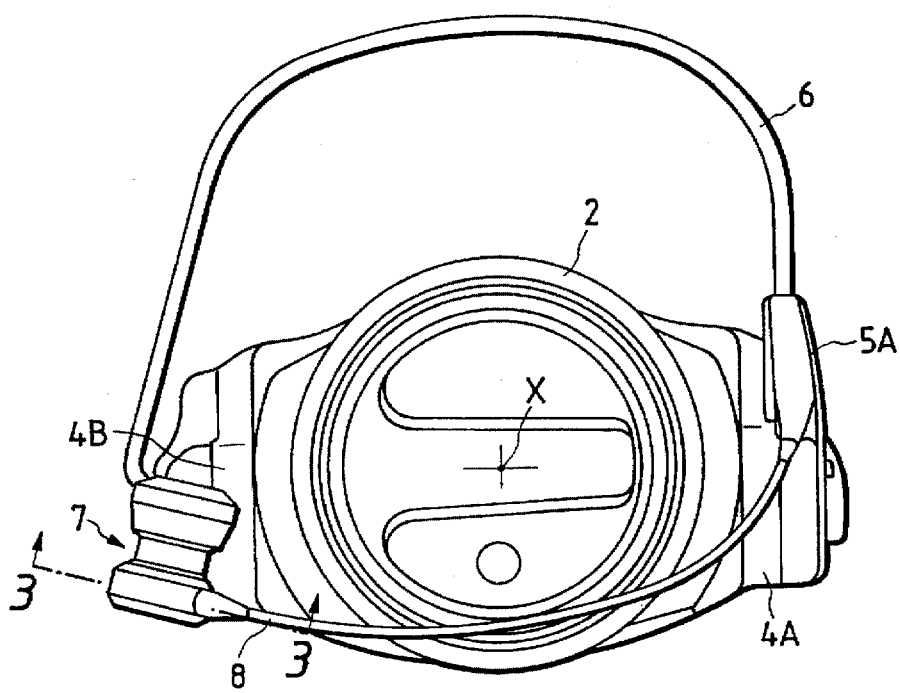
FIG. 2 is an elevational view showing the first embodiment of the present invention.
Figure 3:
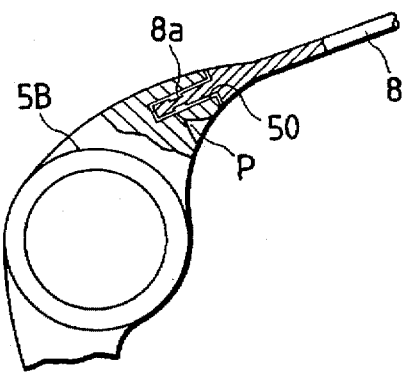
FIG. 3 is a sectional view taken on line 3—3 of FIG. 2.

FIG. 1 is a side view of a spinning reel as a first embodiment of the present invention, FIG. 2 an elevational view thereof, and FIG. 3 a sectional view taken on line 3—3 of FIG. 2.

As shown in FIGS. 1 and 2, a spinning reel according to this embodiment of the invention, like an ordinary spinning reel, comprises a spool 2 fitted to the front part of a reel body 1 in such a way as to move back and forth, a rotor 3 which rotates around the outer periphery of the spool in a spaced relation thereto, bail support arms 4A, 4B each extending forwardly from symmetrical positions of the rotor 3 with the spool 2 located therebetween, and a pair of bail support members 5A, 5B each fitted to the bail support arms 4A, 4B. The bail support members 5A, 5B are fitted in such a manner that the bail support members 5A, 5B are reversible between the fishline playing-out position and the fishline winding position. The spinning reel further comprises a bail 6 installed between the bail support members 5A, 5B, a line roller 7 provided on the side of one support member 5B, and a handle H for use in rotating the rotor 3 and moving the spool 2 back and forth. The mechanisms for moving the spool 2 back and forth and rotating the rotor 3 and the like are not limited to any particular type and may be arranged like any mechanisms in conventional spinning reels. In the drawings, the reference character X is an axis of the spool 2.

According to the first embodiment of the present invention, there is installed a fishline entanglement preventive member 8 between the bail support members 5A, 5B. The fishline entanglement preventive member 8 is affixed to the support members 5A, 5B, respectively on the side opposite to the position where the bail 6 is installed and is formed of a wire member smaller in diameter than the bail 6. More specifically, one end of the fishline entanglement preventive member 8 is attached to the portion of the bail support member 5B that is opposite, with respect to the line roller 7, to the position where the bail 6 is fitted to the bail support member 5B. From this one end, attached as described, the fishline entanglement preventive member 8 bridges across to the opposite bail support member 5A, to which the other end of the bail 7 is fitted. As shown in FIG. 2, the fishline entanglement preventive member 8 in the installed condition is set so as to pass above the flange of the spool 2. This arrangement is intended to prevent the fishline entanglement preventive member 8 from touching the reel body 1 and the rotor 3 when the fishline entanglement preventive member 8 is pulled down so as to reverse the bail 6 when the fishline is played out.

Incidentally, the material used to form the fishline entanglement preventive member 8 is not restricted and use may be made of, for example, metal, plastics, and carbon fiber or the like. Although a fishline entanglement preventive member 8 in the form of a wire member that is smaller in diameter than the bail 6 has been shown, it may be or the same thickness the bail 6 and may also be formed of a tubular member, a plate-like member or the like, as alternatives to the wire member.

FIG. 3 shows a structure for use in fitting the fishline entanglement preventive member 8 to the bail support member 5B. First, an annular groove 8a is circumferentially formed at one end of the fishline entanglement preventive member 8, and then its leading end portion is fitted into a hole 50 bored in the front part of the bail support member 5B. Further, the wall portion P of the bail support member 5B is forced by punching into the annular groove 8a so as to fit the fishline entanglement preventive member 8 securely to the bail support member 5B. In this case, the other end of the fishline entanglement preventive member 8 is also fitted securely to the opposite bail support member 5A in a like manner.

Figure 4:
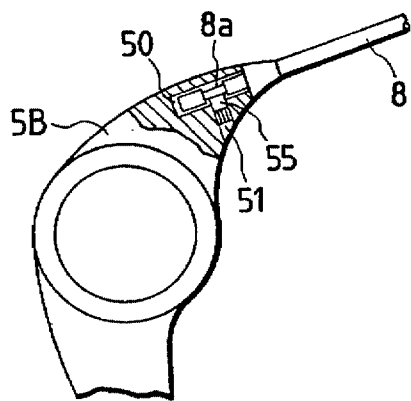
FIG. 4 is a diagram illustrating a modified example of the first embodiment of the present invention and corresponding to the sectional view taken on line 3—3 of FIG. 2.

FIG. 4 shows another example of fitting the fishline entanglement preventive member 8 securely to the bail support member 5B. A pit 51 communicating with the hole 50 for receiving one end of the fishline entanglement preventive member 8 is bored and a pin 55 is forced into the pit 51 so as to mate the leading end portion of the pin 55 with the annular groove 8a of the fishline entanglement preventive member 8. The method of fitting the fishline entanglement preventive member 8 to the bail support member 5A is not limited to these methods described above; for example, they may be combined rigidly with a reinforced adhesive, a screw or the like.

Figure 5:
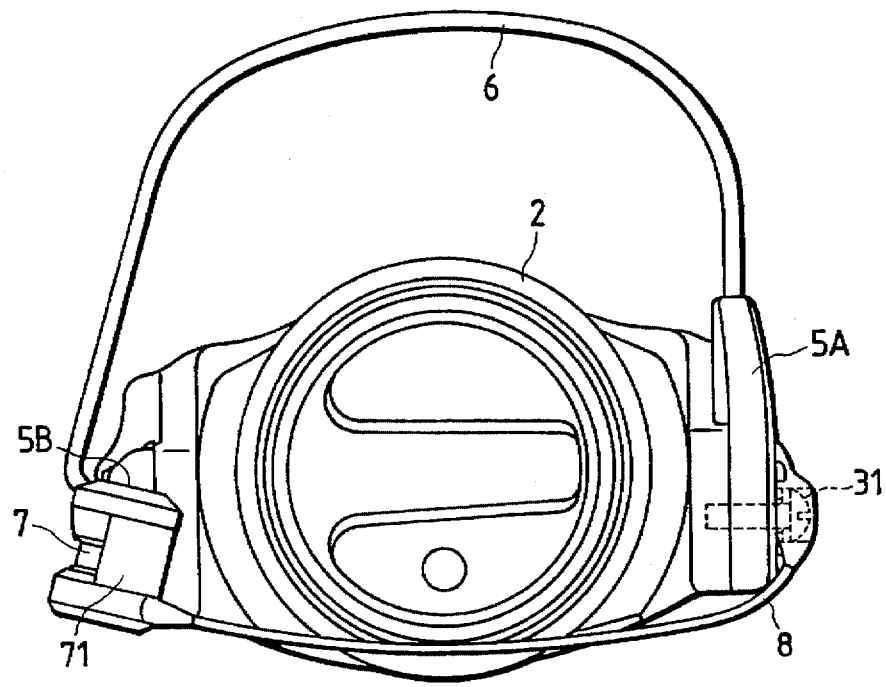
FIG. 5 is an elevational view showing a second embodiment of the present invention.

FIG. 5 shows a second embodiment of the present invention. A cover 71 surrounding the upper inner portion (the portion on the spool side), facing the spool of the line roller 7 is provided on the bail support member 5B, whereby the fishline is kept in contact with the outer portion of the line roller 7 and is prevented from becoming entangled in the bail support member 5B from the inner side of the line roller 7.

Moreover, the other end side of the fishline entanglement preventive member 8 is integrally fitted to a rotor cover 31 of the support arm 4A according to the second embodiment of the present invention.

Figure 6:
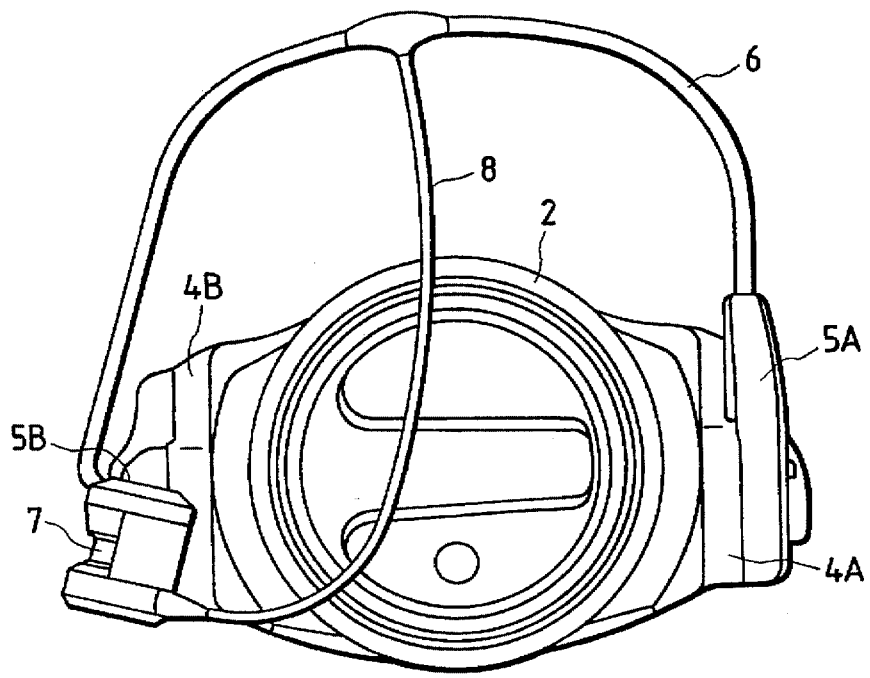
FIG. 6 is an elevational view showing a third embodiment of the present invention.

FIG. 6 shows a third embodiment of the present invention. In this case, the other end side of the fishline entanglement preventive member 8 is securely fitted to a position near the longitudinal center of the bail 6. According to the third embodiment of the present invention, the fishline entanglement preventive member 8 is set so that it passes above the portion of the spool that is between the flange portion of the spool 2 and the central portion thereof. With this arrangement, the bail 6 and the fishline entanglement preventive member 8 can be distributed in a well balanced manner, and thus the eccentricity of the weight toward the bail side is corrected, so that the rotational balance of the rotor 3 is improved.

As set forth above, the fishline in the spinning reel according to the present invention is restrained by the fishline entanglement preventive member from moving outside and behind the line roller even though the fishline being wound slackens and twists, thereby ensuring that the fishline is guided the line roller. Moreover, the fishline is reliably prevented from becoming entangled in the outer end portion in the axial direction of the line roller of the bail support member, so that the spinning reel can be smoothly performed. Thus comfortable fishing can be enjoyed.

As set forth in the second embodiment of the present invention, moreover, the provision of the cover on the inner face of the line roller effectively prevents the fishline from becoming entangled in the line roller. Thus the cover operates in conjuction with the fishline entanglement preventive member, which prevents fishline entanglement at the outer end portion, in the axial direction of the line roller, of the bail support member, whereby smoother operability is achieved.

As set forth in the third embodiment of the present invention, further, the fitting of the fishline entanglement preventive member to the opposite bail side with respect to the center of the spool shaft makes it possible to arrange the bail and the fishline entanglement preventive member in a well balanced manner. As the eccentric application of the weight to the bail side is corrected, the rotational balance of the rotor is improved. The operability of the spinning reel is thereby also improved.

What is claimed is:

1. A spinning reel for fishing comprising:

a reel main body;

a spool supported on the reel main body and having a central axis;

a rotor rotatably supported on the reel main body;

a bail support arm provided on the rotor;

a bail;

a bail support member pivotally supported on the bail support arm and supporting a first end of the bail so that the bail is reversible between a fishline playing-out position and a fishline winding position, the bail support member having a line roller by means of which a fishline is wound onto the spool when the bail is in the fishline winding position and the rotor is rotated; and a fishline entanglement preventive member extending from the bail support member toward a second end of the bail opposite from the first end;

wherein the fishline entanglement preventive member passes over an area located radially inwardly from a flange of the spool with respect to the central axis as viewed in a direction of the central axis of the spool when the bail is in the fishline winding position.

2. A spinning reel for fishing according to claim 1, wherein the fishline entanglement preventive member has a first end fixed to the bail support member, and the line roller is located between the first end of the fishline entanglement preventive member and the first end of the bail.

3. A spinning reel for fishing according to claim 1, wherein the bail and the fishline entanglement preventive member cooperatively define a substantially oval shape as viewed in the direction of the central axis of the spool when the bail is in the fishline winding position.

4. A spinning reel for fishing according to claim 1, further comprising:

a second bail support member pivotally arranged with respect to the rotor;

wherein the fishline entanglement preventive member has a first end fixed to the first bail support member and has a second end that is opposite from the first end and that is fixed to the second bail support member.

5. A spinning reel for fishing according to claim 1, further comprising:

a second bail support arm provided on the rotor;

wherein the fishline entanglement preventive member has a first end fixed to the bail support member and has a second end that is opposite from the first end and that is pivotally supported on the second bail support arm.

6. A spinning reel for fishing according to claim 1, wherein the fishline entanglement preventive member has a first end fixed to the bail support member and has a second end that is opposite from the first end and that is fixed to a middle portion of the bail.

7. A spinning reel for fishing according to claim 1, wherein the fishline entanglement preventive member is located opposite from the bail with respect to the central axis of the spool when the bail is in the fishline winding position.

8. A spinning reel for fishing according to claim 1, further comprising:

a fishline entanglement preventive cover affixed to the line roller and covering at least a part of the line roller facing the spool.

9. A spinning reel for fishing according to claim 1, wherein the fishline entanglement preventive member extends from a distal end of the bail support member.

10. A spinning reel for fishing comprising:

a reel main body;

a spool supported on the reel main body and having a central axis;

a rotor rotatably supported on the reel main body;

a bail support arm provided on the rotor;

a bail;

a first bail support member pivotally supported on the bail support arm and supporting a first end of the bail so that the bail is reversible between a fishline playing-out position and a fishline winding position, the first bail support member having a line roller by means of which a fishline is wound onto the spool when the bail is in the fishline winding position and the rotor is rotated;

a second bail support member pivotally arranged with respect to the rotor; and a fishline entanglement preventive member extending from the first bail support member toward a second end of the bail opposite from the first end;

wherein the fishline entanglement preventive member has a first end fixed to the first bail support member and has a second end that is opposite from the first end and that is fixed to the second bail support member.

11. A spinning reel for fishing according to claim 10, wherein the fishline entanglement preventive member has a first end fixed to the bail support member, and the line roller is disposed between the first end of the fishline entanglement preventive member and the first end of the bail.

12. A spinning reel for fishing according to claim 10, wherein the bail and the fishline entanglement preventive member cooperatively define a substantially oval shape as viewed in the direction of the central axis of the spool when the bail is in the fishline winding position.

13. A spinning reel for fishing according to claim 10, further comprising:

a second bail support arm provided on the rotor;

wherein the fishline entanglement preventive member has a first end fixed to the first bail support member and has a second end that is opposite from the first end and that is pivotally supported on the second bail support arm.

14. A spinning reel for fishing according to claim 10, wherein the fishline entanglement preventive member is located opposite from the bail with respect to the central axis of the spool when the bail is in the fishline winding position.

15. A spinning reel for fishing according to claim 10, further comprising:

a fishline entanglement preventive cover affixed to the line roller and covering at least a part of the line roller facing the spool.

16. A spinning reel for fishing according to claim 10, wherein the fishline entanglement preventive member extends from a distal end of the first bail support member.

17. A spinning reel for fishing comprising:

a reel main body;

a spool supported on the reel main body and having a central axis;

a rotor rotatably supported on the reel main body;

a first bail support arm provided on the rotor;

a second bail support arm provided on the rotor;

a bail;

a bail support member pivotally supported on the first bail support arm and supporting a first end of the bail so that the bail is reversible between a fishline playing-out position and a fishline winding position, the bail support member having a line roller by means of which a fishline is wound onto the spool when the bail is in the fishline winding position and the rotor is rotated; and a fishline entanglement preventive member extending from the bail support member toward a second end of the bail opposite from the first end;

wherein the fishline entanglement preventive member has a first end fixed to the bail support member and has a second end that is opposite from the first end and that is pivotally supported on the second bail support arm.

18. A spinning reel for fishing according to claim 17, wherein the fishline entanglement preventive member has a first end fixed to the bail support member, and the line roller is disposed between the first end of the fishline entanglement preventive member and the first end of the bail.

19. A spinning reel for fishing according to claim 17, wherein the bail and fishline entanglement preventive member cooperatively define a substantially oval shape as viewed in the direction of the central axis of the spool when the bail is in the fishline winding position.

20. A spinning reel for fishing according to claim 17, wherein the fishline entanglement preventive member is located opposite from the bail with respect to the central axis of the spool when the bail is in the fishline winding position.

21. A spinning reel for fishing according to claim 17, further comprising:

a fishline entanglement preventive cover affixed to the line roller and covering at least a part of the line roller facing the spool.

22. A spinning reel for fishing according to claim 17, wherein the fishline entanglement preventive member extends from a distal end of the bail support member.

23. A spinning reel for fishing comprising:

a reel main body;

a spool supported on the reel main body and having a central axis;

a rotor rotatably supported on the reel main body;

a bail support arm provided on the rotor;

a bail;

a bail support member pivotally supported on the bail support arm and supporting a first end of the bail so that the bail is reversible between a fishline playing-out position and a fishline winding position, the bail support member having a line roller by means of which a fishline is wound onto the spool when the bail is in the fishline winding position and the rotor is rotated; and a fishline entanglement preventive member extending from a first end fixed to the bail support member to a second end that is opposite the first end and is fixed to a central portion of the bail, wherein the central portion is approximately equidistant from the first end of the bail and a second end of the bail.

24. A spinning reel for fishing according to claim 23, wherein the fishline entanglement preventive member has a first end fixed to the bail support member, and the line roller is disposed between the first end of the fishline entanglement preventive member and the first end of the bail.

25. A spinning reel for fishing according to claim 23, further comprising:

a fishline entanglement preventive cover affixed to the line roller and covering at least a part of the line roller facing the spool.

26. A spinning reel for fishing according to claim 23, wherein the fishline entanglement preventive member extends from a distal end of the bail support member.

27. A spinning reel for fishing comprising:

a reel main body;

a spool supported on said reel main body and having a central axis;

a rotor rotatably supported on said reel main body;

a bail support arm provided on said rotor;

a bail;

a bail support member pivotally supported on said bail support arm and supporting a first end of said bail so that said bail may be toggled between a fishline playing-out position and a fishline winding position, said bail support member comprising a line roller for winding a fishline onto said spool when said bail is in the fishline winding position and said rotor is rotated; and a fishline entanglement preventing member fixed to said bail support member, wherein, when said bail is in the fishline winding position, said fishline entanglement preventing member extends from said bail support member generally in a direction toward said spool, as viewed from a vantage point on the central axis that is directed toward said spool, and said fishline entanglement preventing member forms a barrier preventing the fishline from looping over an end portion of said bail support member, the end portion of said bail support member lying on an axis of the line roller and facing away from the line roller.

* * * * *